United States Patent
Åkervik

(10) Patent No.: US 9,426,086 B2
(45) Date of Patent: Aug. 23, 2016

(54) SUB FLOW BASED QUEUEING MANAGEMENT

(75) Inventor: Mattias Åkervik, Kista (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 32 days.

(21) Appl. No.: 14/379,661

(22) PCT Filed: Feb. 23, 2012

(86) PCT No.: PCT/SE2012/050206
§ 371 (c)(1),
(2), (4) Date: Aug. 19, 2014

(87) PCT Pub. No.: WO2013/125999
PCT Pub. Date: Aug. 29, 2013

(65) Prior Publication Data
US 2014/0376565 A1  Dec. 25, 2014

(51) Int. Cl.
*H04L 12/863* (2013.01)
*H04L 12/865* (2013.01)
*H04W 28/02* (2009.01)
*H04W 28/10* (2009.01)
*H04L 12/801* (2013.01)
(Continued)

(52) U.S. Cl.
CPC ........ *H04L 47/6215* (2013.01); *H04L 47/2433* (2013.01); *H04L 47/30* (2013.01); *H04L 47/39* (2013.01); *H04L 47/628* (2013.01); *H04L 47/6255* (2013.01); *H04L 47/6275* (2013.01); *H04W 28/0252* (2013.01); *H04W 28/10* (2013.01)

(58) Field of Classification Search
CPC ............ H04L 47/6215; H04L 47/6275; H04L 47/628; H04L 47/39; H04L 47/6255; H04L 47/2433; H04L 47/30; H04W 28/0252; H04W 28/10
See application file for complete search history.

(56) References Cited

U.S. PATENT DOCUMENTS

| 9,331,948 B2 * | 5/2016 | Venekataswami ...... H04L 47/24 |
| 2003/0189930 A1 * | 10/2003 | Terrell ................... H04L 45/00 370/389 |
| 2007/0297435 A1 | 12/2007 | Bucknell et al. |

(Continued)

FOREIGN PATENT DOCUMENTS

| EP | 1730903 A2 | 12/2006 |
| EP | 2 262 306 A1 | 12/2010 |

(Continued)

OTHER PUBLICATIONS

International Search Report for International Application No. PCT/SE2012/050206 mailed Mar. 13, 2013, 4 pages.

(Continued)

*Primary Examiner* — Ajay Cattungal
(74) *Attorney, Agent, or Firm* — Patent Portfolio Builders, PLLC

(57) ABSTRACT

Nodes and related methods are directed to grouping PDUs into sub flows based on information elements of the PDUs and selecting PDUs from sub flow according to a priority indicator calculated for each sub flow. The selected PDUs are sent in an order that provides a fairer resource sharing for real time like service sessions at the expense of bandwidth greedy applications. Reduced delay variability and/or reduced PDU loss probability may be obtained for real time like services when network transport resources are shared with bandwidth greedy services, such as file transfers over TCP.

19 Claims, 3 Drawing Sheets

(51) Int. Cl.
*H04L 12/851* (2013.01)
*H04L 12/835* (2013.01)

(56) References Cited

U.S. PATENT DOCUMENTS

| | | | |
|---|---|---|---|
| 2008/0008202 A1* | 1/2008 | Terrell | H04L 12/5693 370/401 |
| 2008/0101290 A1* | 5/2008 | Sung | H04L 1/1825 370/331 |
| 2009/0221242 A1* | 9/2009 | Bergstrom | H04L 1/1832 455/73 |
| 2010/0157915 A1 | 6/2010 | Tsai | |
| 2012/0099538 A1* | 4/2012 | Venkataswami | H04W 76/022 370/329 |
| 2012/0106507 A1* | 5/2012 | Venkataswami | H04L 45/50 370/331 |

FOREIGN PATENT DOCUMENTS

| | | |
|---|---|---|
| WO | WO 2006/062306 A1 | 6/2006 |
| WO | WO 2008/009300 A1 | 1/2008 |

OTHER PUBLICATIONS

International Preliminary Report on Patentability including the Written Opinion of the International Searching Authority for International Application No. PCT/SE2012/050206 mailed Mar. 13, 2013, 7 pages.

* cited by examiner

U S 9,426,086 B2

SUB FLOW BASED QUEUEING MANAGEMENT

CROSS-REFERENCE TO RELATED APPLICATION

This application is a 35 U.S.C. §371 national stage application of PCT International Application No. PCT/SE2012/050206, filed on 23 Feb. 2012, the disclosure of which is incorporated by reference herein in its entirety. The above-referenced PCT International Application was published in the English language as International Publication No. WO 2013/125999 A1 on 29 Aug. 2013.

TECHNICAL FIELD

This disclosure pertains in general to the field of queue management, and more particularly to a method and a node for sub flow based queuing management of Protocol Data Units (PDUs).

BACKGROUND

Data queuing and management techniques therefore are well known and are used in existing and commercially available network equipments. These techniques are mainly developed for link characteristics in networks with stable and static bandwidth conditions.

Due to various reasons the bandwidth capacity in a network can vary over time.

The need for traffic queuing for data services using a communication system varies with the available capacity. The desired data queue lengths in good conditions differ from the ones in poor conditions.

There is hence a more challenging demand on data queuing management in systems with varying conditions than compared to systems with static and stable conditions, for reliable data services.

Utilizing known and existing techniques for data queuing in communication systems with varying conditions may reduce the quality of experience for delay sensitive services due to the fact that a relatively long queuing delay is allowed in such communications systems.

SUMMARY

In view of the above, it is a general object of embodiments of the invention to provide for improved data queuing management. Also, it would be advantageous to provide data queuing management with which the delay and/or delay variance for real time services can be lowered.

According to one aspect of this disclosure a method for queue management of PDUs is disclosed. The method comprises receiving a flow of PDUs and associating each PDU with a flow reference that is determined based on information elements in at least each PDU header. The method also comprises grouping all PDUs having the same flow reference into respective sub flows, and determining a priority indicator for each sub flow based on the length of the sub flows. In addition, the method comprises selecting one or more PDUs from sub flows in an order of the sub flows which is indicated by the priority indicator, and sending the selected PDUs.

Determining of the priority indicator for each sub flow may be based on the length of the received PDUs in each sub flow.

The determining of the priority indicator for each sub flow based on the length of the sub flows may comprise determining the highest priority for each sub flow having only one single PDU.

The associating each PDU with a flow reference may comprise associating each PDU of the same service session with the same flow reference, where each PDU is part of a service session as indicated by each PDU header.

The method for queue management of PDUs may further comprise detecting a triggering condition comprising detecting one of: receipt of Medium Access Control-d (MAC-d)-layer information, receipt of information related to the control layer of Radio Link Control (RLC), and receipt of a PDU into a sub flow, wherein the detecting of the triggering condition triggers the determining of the priority indicator, the selecting one or more PDUs from sub flows, or the sending the selected PDUs.

The information elements, in associating each PDU with a flow reference that is determined based on information elements in at least each PDU header, may comprise at least one of: a protocol or application type, a source Internet Protocol (IP) address, a destination IP address, a source port and a destination port, which all are at least associated with a service session.

Receiving a flow of PDUs may comprise receiving a flow of PDUs within a single Radio Access Bearer (RAB).

The receiving of a flow of PDUs may comprise receiving PDUs on a first protocol layer, wherein the sending the selected PDUs may comprise sending the selected PDUs on a second protocol layer, and wherein the first protocol layer is a higher protocol layer than the second protocol layer.

The first protocol layer in receiving PDUs on a first protocol layer, may comprise any of Internet Protocol (IP), Transmission Control Protocol (TCP), User Datagram Protocol (UDP), Real-Time Control Protocol (RTCP), Datagram Congestion Control Protocol (DCCP), Stream Control Transmission Protocol (SCTP), Resource reservation Protocol (RSVP), Real-Time Transport Protocol (RTP), and Explicit Congestion Notification (ECN).

The second protocol layer within the method for queue management of PDUs may comprise RLC layer or MAC-d, layer.

According to a second aspect of the present disclosure, a node for queue management of PDUs is disclosed. The node comprises a first interface that is configured to receive a flow of PDUs and associate each PDU with a flow reference that is determined based on information elements in at least each PDU header, and a classifier that is configured to group all PDUs having the same flow reference into respective sub flows. The node also comprises a selector that is configured to determine a priority indicator for each sub flow based on the length of the sub flows, and select one or more PDUs from sub flows in an order of the sub flows which is indicated by the priority indicator. In addition, the node comprises a second interface configured to send the selected PDUs.

The selector of the node may be configured to determine the priority indicator for each sub flow based on the PDUs grouped into each sub flow.

The selector of the node may be configured to determine the highest priority for each sub flow having only one single PDU.

The first interface of the node may be configured to associate each PDU of the same service session with the same flow reference, where each PDU is part of a service session as indicated by the PDU header.

The selector of the node may be configured to detect a triggering condition that comprises one of: receipt of MAC-layer information, receipt of information related to the control layer of Radio Link Control, RLC, and receipt of a PDU grouped into a sub flow, wherein the detection of the triggering condition triggers the selector to determine the priority indicator, or to select one or more PDUs from sub flows, or the second interface to send the selected PDUs.

The first interface of the node may be configured to receive PDUs on a first protocol layer, and wherein the second interface may be configured to send the selected PDUs on a second protocol layer, wherein the first protocol layer is a higher protocol layer than the second protocol layer.

The first interface of the node is configured to receive PDUs on a first protocol layer where the first protocol layer may comprise any of: IP, TCP, UDP, RTCP, DCCP, SCTP, RSVP, RTP and ECN.

The second interface of the node is configured to send PDUs on a second protocol layer where the second protocol layer may comprise RLC layer or MAC-d, layer.

The node for queue management of PDUs may be a Radio Network Controller, RNC, a Base Station, a NodeB or an eNodeB.

Embodiments of the present disclosure come with one or more the following advantages:

The present disclosure has substantial effect in systems where the available link capacity varies over time. Especially high effect is gained in systems with transmission links that experience a large delay variance, for instance mobile communication systems such as Universal Mobile Telecommunications System (UMTS), World Interoperability for Microwave Access (WiMAX), or Long Term Evolution (LTE).

One advantage with some embodiments of the present disclosure is that it results in reduced delay variability for real time like services when network transport resources are shared with bandwidth greedy services, such as file transfers over TCP.

Another advantage with some embodiments of the present disclosure is a reduced PDU loss probability for real time-like services when network transport resources are shared with bandwidth greedy services, such as file transfers over TCP.

Real time services are, in the end to end perspective, sensitive to long delays, PDU losses, jitter, and insufficient bandwidth. Some embodiments of the present disclosure increase the chance for real time services to get desired bandwidth capacity and reduces both the delay variance and the risk for PDU losses.

BRIEF DESCRIPTION OF DRAWINGS

These and other aspects, features and advantages of which this disclosure is capable of, will be apparent and elucidated from the following description of embodiments of this disclosure, reference being made to the accompanying drawings, in which FIG. 1 briefly illustrates a signalling scheme related to embodiments of the present disclosure.

ABBREVIATIONS

ACK Acknowledgement
AQM Active Queue Management
CN Core Network
DCCP Datagram Congestion Control Protocol
ECN Explicit Congestion Notification
FIFO First In First Out
IP Internet Protocol
LTE Long term Evolution
MAC-d Medium Access Control-d
OSI Open Systems Interconnection
PDU Protocol Data Unit
RLC Radio Link Control
RNC Radio Network Controller
RSVP Resource Reservation Protocol
RTCP Real-Time Control Protocol
RTP Real-Time Transport Protocol
SCTP Stream Control Transmission Protocol
SDU Service Data Unit
TCP Transmission Control Protocol
UDP User Datagram Protocol
UE User Equipment
UMTS Universal Mobile Telecommunications System
WCDMA Wideband Code Division Multiple Access
WiMAX World Interoperability for Microwave Access

DETAILED DESCRIPTION

The present disclosure provides a generic method and arrangement for queue management of IP packets, with which bandwidth greedy services are served with less probability than services with low requirement on buffering.

Instead of treating all incoming data for a data flow the same, the data flow is mapped into sub flows based on the characteristics of the IP packets. Each sub flow is prioritized differently depending on the traffic characteristics for the specific sub flow. Applied to bandwidth varying links in communication networks, real time sensitive services will experience a fairer resource sharing at the sacrifice of bandwidth greedy services.

Implementing embodiments presented in this disclosure will result in lower delay variance for real time services with lower bandwidth requirements than available link capacity. This is done on the expense of services that try to maximize the link utilization.

Figure 1:
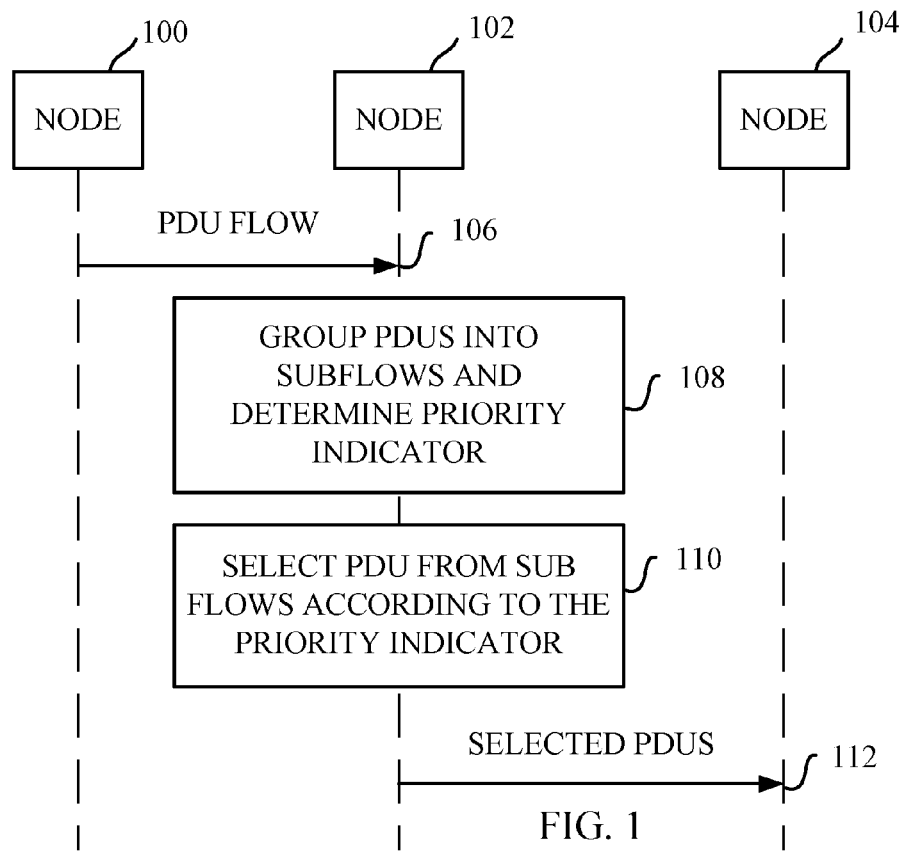

FIG. 1 presents a simplified signalling scheme of signalling between a first node 100, a second node 102 and a third node 104. The first node 100 sends 106 a flow of Protocol Data Units, PDUs, to the second node 102. The second node 102 groups 108 the received PDUs into sub flows based on characteristics of the received PDUs. The second node 102 determines 108 a priority indicator for each sub flow based on the length of the sub flows. Having determined a priority indicator, the second node 102 selects 110 one or more PDUs in an order of the sub flows, which order is indicated by the priority indicator. The second node 102 sends 110 the selected one or more PDUs to the third node 104.

Figure 2:
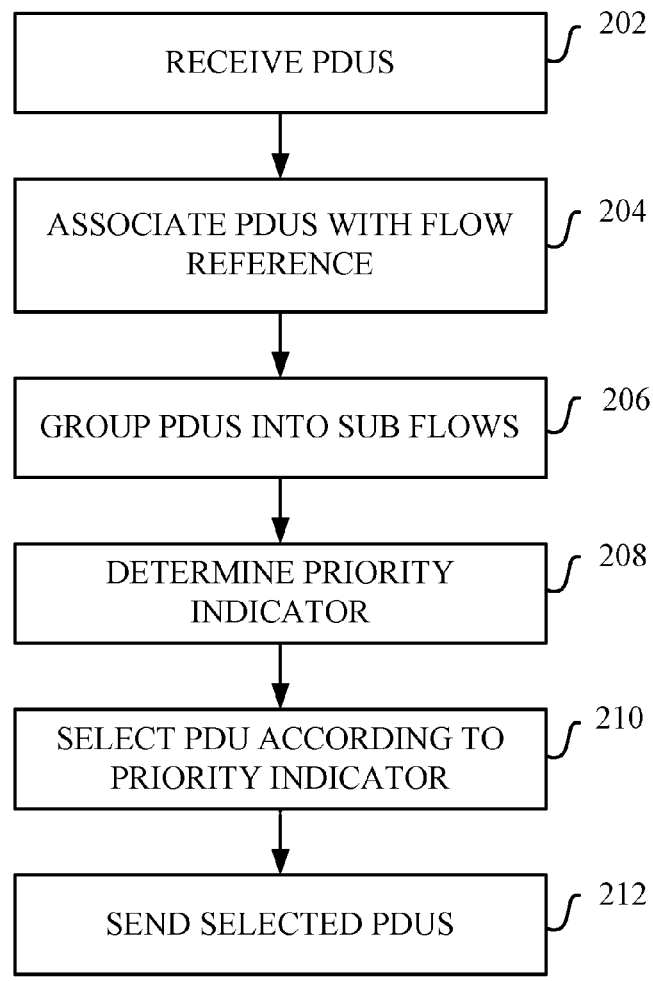
FIGS. 2 and 4 illustrate flowcharts of methods according to embodiments of the present disclosure.

FIG. 2 presents a flow chart of method steps for queue management of PDUs in a node according to the present disclosure. Method step 202 comprises receiving a flow of PDUs. In 204 the method associates each PDU with a flow reference that is determined based on information elements in at least each PDU header. Step 206 comprises grouping all PDUs having the same flow reference into respective sub flows. In 208 the method determines a priority indicator for each sub flow based on the length of the sub flows. In 210 the method selects one or more PDUs from sub flows in an order of the sub flows which is indicated by the priority indicator. In 212 the method sends the selected PDUs.

Figure 3:
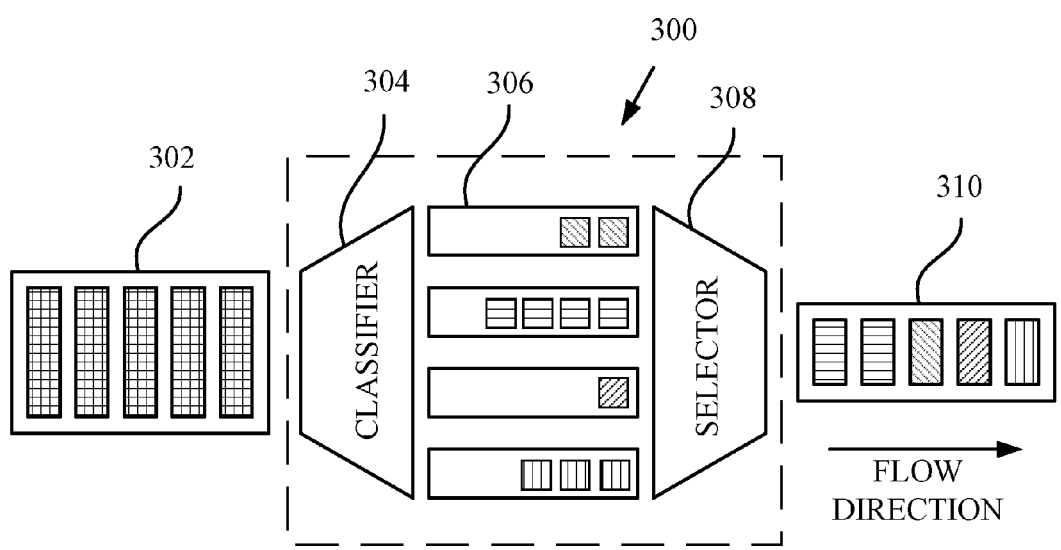
FIG. 3 schematically illustrates queuing management according to embodiments of the present disclosure.

FIG. 3 schematically illustrates queuing management according to some embodiments of the present disclosure. At first a flow 302 of PDUs are received. These PDUs may be received on a first protocol layer, for instance layer 3 of the 7-layered Open Systems Interconnection (OSI) model. Based on information elements of the header of at least each PDU, a flow reference is calculated for each PDU. The information elements may comprise at least one of the, so called, 5-tuple that is specific for each session of an application or a service. The 5-tuple comprises a protocol or application type, a source IP address, a destination IP address, a source port and a destination port, which all are at least associated with a service session. The flow reference may thus be calculated as a function of the 5-tuple.

A classifier 304 is configured to group the received PDUs into sub flows 306 according to the calculated flow reference.

It should be mentioned that all PDUs from one and the same service session, has the same information elements, for which reason the flow reference will be the same for all PDUs within an entire service session.

Different service sessions may result in the same flow reference, and hence PDUs from different service sessions, may be grouped into the same sub flow. PDUs of instances of different applications may thus well be grouped into the same sub flow. Differently put, one sub flow may comprise PDU from service sessions of different applications.

PDUs from different service sessions may be grouped into different sub flows. The sub flows may thus receive various numbers of PDUs. Different sub flows may hence comprise a different number of PDUs. Worded differently, the queue length of each sub flow may thus differ from sub flow to sub flow.

It should further be mentioned that PDUs within each sub flow may be served in a FIFO way, i.e. First In First Out. The PDU that was the first to be received in the sub flow, will be the first one to be selected from the sub flow. The chronologic order of the PDUs within each sub flow is thus preserved.

A selector 308 is configured to determine a priority indicator for each sub flow 306 based on the length of the sub flows. The priority indicator may be determined based on the number of PDUs in sub flow.

In some embodiments of the present disclosure, the priority indicator is also based on the PDU length in each sub flow.

Sub flows having only one PDU are assigned with the highest priority indicator, and thus given the highest priority. One or more PDUs will be selected from sub flows in an order as indicated by the priority indicator. These selected PDUs will then be sent.

In FIG. 3, an arrow indicates a direction of an example flow 310 that is being sent. It should be noted that PDUs may be sent on a protocol layer that is lower than the one on which PDUs are received.

For instance, if the PDUs are received on protocol layer 3, they may be sent on protocol layer 2.

The payload of a PDU of a certain layer N, corresponds to the Service Data Unit, SDU, of the same layer. Moreover, the PDU of a layer N corresponds to the payload or SDU of layer N−1. This means that the PDUs from layer 3 will equal to the SDUs of layer 2.

It can be mentioned that the SDU of layer 2 will together with a header, form a PDU of layer 2. In the case of segmentation, a subset of the SDU of layer 2 and a header forms a PDU of layer 2.

The flow 310 may comprise PDUs selected from different sub flows. The filling character of each PDU in flow 310, as illustrated in FIG. 3, indicates the sub flow from which the PDUs was selected to be sent. For instance, the rightmost PDU of flow 310 was chosen from the bottom most sub flow of FIG. 3. The second PDU from the right having a first diagonal filling, was chosen from the sub flow second from the bottom. The middle PDU in the flow 310 was chosen from the topmost sub flow, whereas the last and second last PDUs were chosen from the second sub flow from the top. PDUs of this sub flow have a horizontal filling character.

It is again stated that the priority indicator of the sub flow is based on the length of each sub flow. Sub flows having only one single PDU will be given the highest priority indicator. The rightmost PDU, the second PDU from the right and the middle PDU of flow 310, are examples of PDUs that are chosen from sub flows. Since the sub flows having only one single PDU are assigned with the highest priority indicator, selection of PDUs is made from these sub flows having highest priority.

According to some embodiments of the present disclosure, the PDU from two or more sub flows having only one single PDU each is selected on the basis of the length of the PDU. The shortest PDU may this be chosen, before choosing any of the other single PDUs.

The present disclosure allows a number of different ways to select PDUs as long as they fall within the scope of the present disclosure. The priority indicator indicates from which sub flow PDUs are to be selected. The shorter the sub flow is, the higher the priority indicator of the sub flows. The selecting one or more PDUs from the prioritized sub flow may be performed in a number of ways.

For instance, the selecting of single PDUs is performed with highest priority. Selecting of PDUs from sub flows wherein the PDUs are the shortest may also be performed. It is stated that the sub flow having a single PDU of a certain length, has the highest priority. A sub flow having two PDUs, wherein each PDU is less or much less than half the length of the single PDU, has typically a lower priority indicator.

Figure 4:
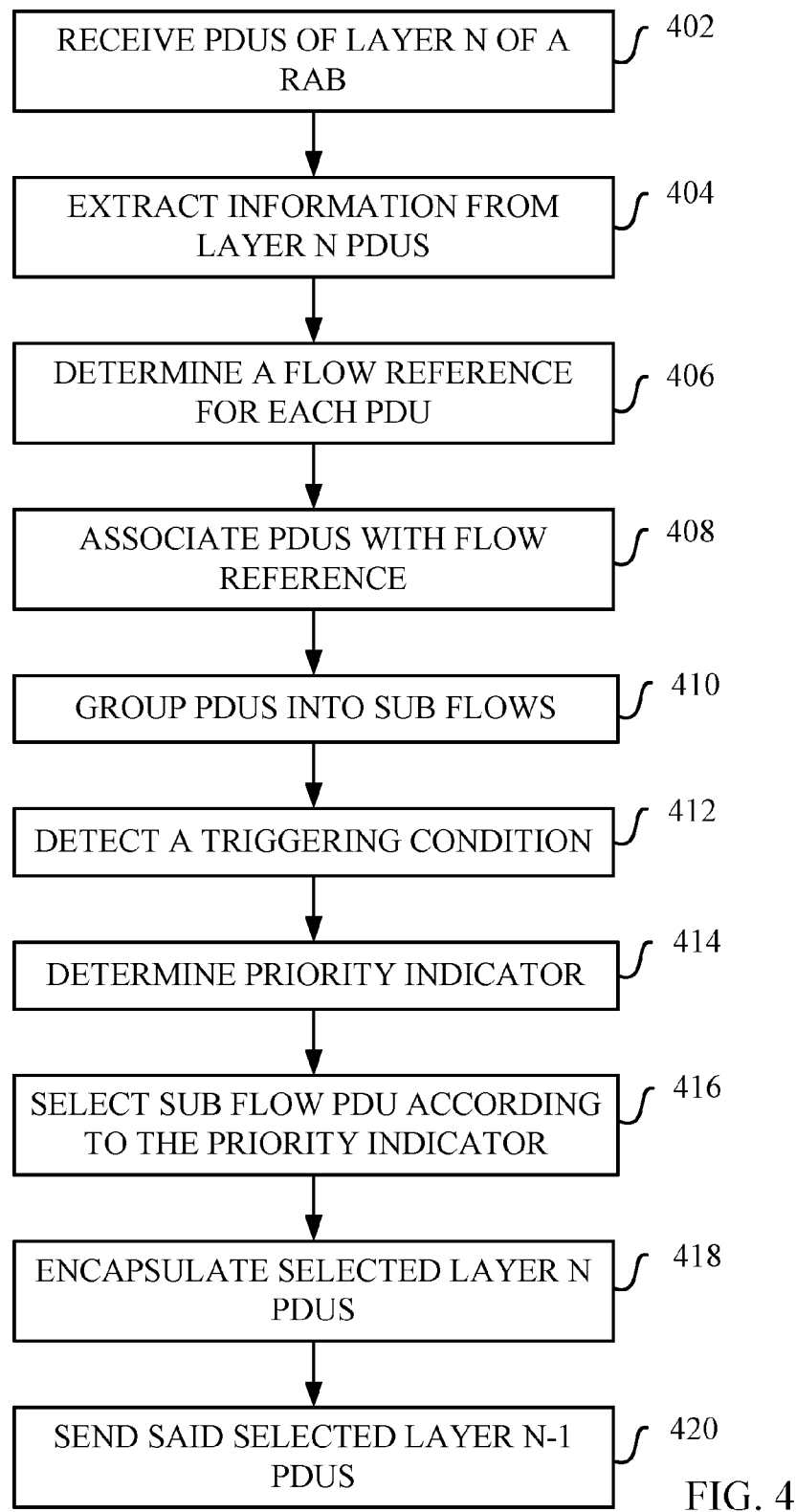

FIG. 4 presents a flow chart of method steps according to some embodiments of the present disclosure. The method is a method for queue management of PDUs in a node of a radio communication network. Method step 402 comprises receiving PDUs of layer N of a Radio Access Bearer (RAB). The RAB is typically established between a core network of the radio communication network and a device with communication capability within said radio communication network. A RAB comprises one or more flows of PDUs of service sessions per user. That is, a RAB may for instance comprise flows of PDUs for a chat session, a surfing session at the same time as a video call with a friend. The RAB comprises PDUs of one user or device.

In step 404 the method extracts information from information elements of the received layer N PDUs. The information elements may comprise the 5-tuple of information, that is the protocol or application type being used for the service, the source IP address of the PDUs, the destination IP address of the PDUs, the source port and the destination port, used by the PDUs.

In step 406 the method determines a flow reference for each PDU based on the information elements in at least each PDU. The flow reference of one PDU may thus also be based on information elements of another PDU, in addition to the information elements of said one PDU.

In 408 the method associates the PDUs with the determined flow reference of each PDU.

In 410 the method groups the received PDUs into sub flows. Herein all PDUs having the same flow reference are grouped in respective sub flows. For instance, all PDUs having the flow reference "10" can be grouped in one sub flow, whereas PDUs having the flow reference "11" are grouped into another sub flow, since the flow reference "10" is different from "11".

In 412 the method detects a triggering condition. The triggering condition may comprise one of the following: detection of receipt of MAC-layer information, receipt of information related to the control layer of Radio Link Control, RLC, and receipt of a PDU into a sub flow. Detection of the triggering condition may trigger step 414 to determine a priority indicator for each sub flow based on the length of each sub flow.

The method may further determine the priority indicator for each sub flow based on the length of the received PDUs in each sub flow. Also, the determination may comprise to determine the highest priority indicator to the sub flow having only one single PDU.

In 416 the method selects one or more PDUs from a sub flow in an order that is indicated by the priority indicator. In the case a sub flow has only one single PDU, this PDU will be selected with highest priority from said sub flow.

In 418 the method encapsulates the selected layer N PDUs to layer N−1 PDUs. For instance, in the case a single PDU of protocol layer 3 was selected in step 416, this PDU is now encapsulated into a PDU layer on layer 2. The layer 3 PDU here forms the SDU, of the PDU on layer 2.

In step 420 the method sends the selected layer N−1 PDUs. For instance, the selected layer 2 PDU is here sent.

It is added that PDUs that are received may be received on a protocol layer comprising one of: Internet Protocol (IP), Transmission Control Protocol (TCP), User Datagram Protocol (UDP), Real-Time Control Protocol (RTCP), Datagram Congestion Control Protocol (DCCP), Stream Control Transmission Protocol (SCTP), Resource reservation Protocol (RSVP), Real-Time Transport Protocol (RTP) and Explicit Congestion Notification (ECN).

In addition, the PDU that are sent may be sent on RLC layer or the Medium Access Control-d, MAC-d, layer.

PDUs of service instances are thus grouped into sub flows. The grouping of these PDUS may be considered to be performed by a sub flow classification function. Each incoming PDU in the flow 302 is thus grouped into a sub flow. The PDUs may be considered to be classified and assigned to sub flows. Each sub flow is identified by a unique flow reference. Note that each sub flow has a unique flow reference, whereas two service sessions may have associated the same flow reference.

It should be emphasized that although grouping and classifying is used herein, the handling of PDUs should be regarded as logical since the sub flows are merely logical sub flows, rather than physical sub flows that are separated in real space from each other. The handling of the PDUs are however compatible with, and may be understood as, using physical sub flows.

The properties of the sub flow classification function are such that all PDUs for a service session are assigned to the same sub flow. The PDUs are grouped into sub flows according to the flow reference calculated. When a large number of PDUs have been classified or grouped into sub flows, a considerable number of different flow references ranging over a large flow reference value range, have been calculated.

As mentioned above, the determination of the flow reference is based on information elements in the header of the PDUs. The source and destination addresses and protocol from the PDU headers are used. When available the source and destination port from layer 4 PDU may also be used.

As noted above, the determined flow reference does not uniquely identify a high layer service, rather a set of services that may share the same flow reference.

Following the FIFO management, when a maximum number of PDUs has been buffered in the sub flow, or when an Active Queue Management (AQM) discard threshold has been reached, the oldest PDU from the longest sub flow may be discarded.

PDU handling prior to sending is thus modified to be able to provide a per sub flow priority handling. External restrictions may limit the number of sub flows that can be simultaneously active in a system. For this reason multiple higher layer data flows may be aggregated into a single sub flow. Note that a specific higher layer flow of PDUs always is classified to the very same internal sub flow. The number of sub flow to be supported is a trade off between possible resource usage to handle each sub flow and the maximum number of simultaneous data flows that each device with communication capability is estimated to have active on a single traffic radio bearer at any point in time.

When a PDU is added to a sub flow, a priority indicator may be calculated, based both on the received PDU length and the sub flow length, and can be assigned to the PDU.

In order to provide a per sub flow priority handling the PDU handling is thus modified according to the present disclosure.

When for instance a PDU segmentation function requests a new PDU, sub flows containing a single PDU is prioritized in the same order as their priority indicator indicates. When there are no such flows having a single PDU, a PDU may be selected from an arbitrary sub flow, for a subsequent segmentation of the PDU before sending the PDUs.

When PDUs from a sub flow has been selected, the PDU may be sent on a lower a layer for further processing.

Figure 5:
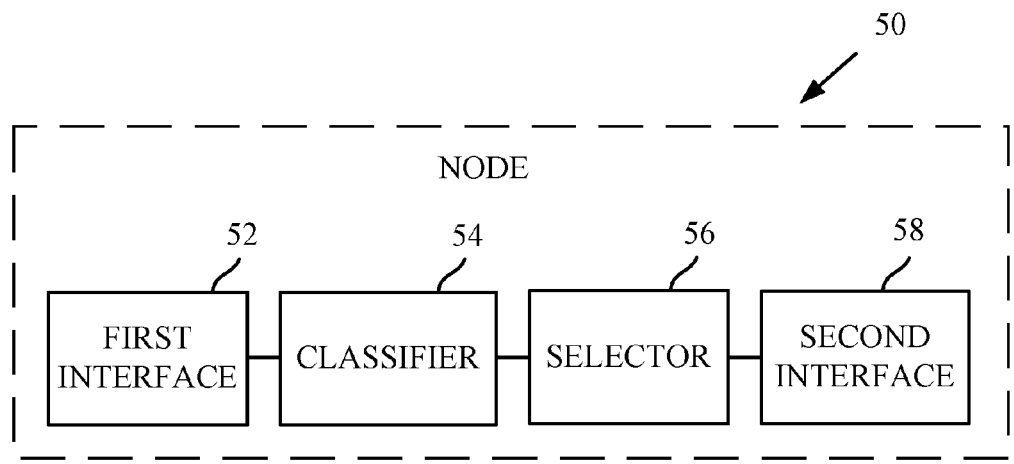
FIG. 5 illustrates a node according to embodiments of the present disclosure.

FIG. 5 schematically presents a node 50 for queue management of PDUs. The node 50 comprises a first interface 52 that is configured to receive 106, 202, 402 PDUs and associate each PDU with a flow reference that is determined based on information elements in at least each PDUs. The node 50 also comprises a classifier that is configured to group 108, 206, 410 all PDUs having the same flow reference into respective sub flows 306. The node 50 also comprises a selector 56 that is configured to determine 108, 208, 414 a priority indicator for each sub flow based on the length of the sub flows, and select 110, 210, 416 one or more PDUs from sub flows in an order of the sub flows which is indicated by the priority indicator. In addition, the node 50 comprises a second interface 58 that is configured to send 112, 212, 420 the selected PDUs.

The selector 56 of the node 50 may further be configured to determine the priority indicator for each sub flow 306 based on the PDUs grouped into each sub flow.

The selector 56 of the node 50 may further be configured to determine the highest priority for each sub flow 306 that has only one single PDU.

The first interface of the node 50 may be configured to associate each PDU of the same service session with the same flow reference. Each PDU is part of a service session as indicated by the PDU header.

The selector 56 of the node may further be configured to detect 412 a triggering condition that comprises one of detecting receipt of MAC-layer information, receipt of information related to the control layer of Radio Link Control, RLC, and receipt of a PDU grouped into a sub flow 306. The detecting of the triggering condition may trigger the selector 56 to determine 108, 208, 414 the priority indicator, or to select 110, 210, 416 one or more PDUs from sub flows. The detecting of the triggering condition may trigger the second interface to send 112, 212, 420 the selected PDUs.

The first interface 52 of the node 50 may be configured to receive 106, 202, 402 PDUs on one protocol layer, whereas the second interface 58 of the node 50 may be configured to send 112, 212, 420 the selected PDUs on another protocol layer, wherein said one protocol layer is a higher protocol layer than said another protocol layer.

For instance said one protocol layer may be any of: IP, TCP, UDP, RTCP, DCCP, SCTP, RSVP, RTP and ECN.

Said another protocol that may be a lower protocol than the first protocol may be RLC layer protocol or MAC-d, layer protocol.

The first interface 52 may also configured to extract information from information elements comprising at least one of: a protocol type of the flow, a source IP address, a destination IP address, a source port and a destination port, which all are at least associated with the service session.

Moreover, the node 50 may be base station, such as a NodeB, an eNodeB, or a Radio Network Controller (RNC).

According to one example a RNC receives a flow of PDUs from a Core Network (CN) of a communication system.

The present disclosure may be applied to number of link capacity techniques. Data networks are comprised within the group of networks and access techniques within which the present disclosure may be implemented. In the case of a data network, the node 50 is typically a data server or a network router.

Within WCDMA, the node 50 is a RNC. Looking back at FIG. 1, and implementing the node 102 as a RNC, node 100 is a Core Network (CN), and node 104 a NodeB.

When applying the present disclosure to WiMAX, node 102 is implemented as a base station. Applying the present disclosure to LTE, the node 50 is preferably implemented as an eNodeB.

Embodiments of the present disclosure come with one or more of the following advantages:

The present disclosure has substantial effect in system where the available link capacity varies over time. Especially high effect is gained in systems with transmission links that experience a large delay variance, for instance mobile communication systems such as Universal Mobile Telecommunications System (UMTS), World Interoperability for Microwave Access (WiMAX), or Long Term Evolution (LTE).

One advantage with the present disclosure is that it results in reduced delay variability for real time like services when network transport resources are shared with bandwidth greedy services, such as file transfers over Transmission Control Protocol (TCP).

Another advantage is a reduced PDU loss probability for real time like services when network transport resources are shared with bandwidth greedy services, such as file transfers over TCP.

Real time services are, in the end to end perspective, sensitive to long delays, PDU losses, jitter, and insufficient bandwidth. This invention increases the chance for real time services to get desired bandwidth capacity and reduces both the delay variance and the risk for PDU losses.

It should be emphasized that this disclosure may be varied in many ways.

The elements of an embodiment of this disclosure may be physically, functionally and logically implemented in any suitable way. Indeed, the functionality may be implemented in a single unit, in a plurality of units or as part of other functional units. As such, this disclosure may be implemented in a single unit, or may be physically and functionally distributed between different units, interfaces and processors.

Moreover, even though the embodiments of this disclosure are primarily described in the form of methods and network nodes, they may at least partly be embodied in a computer program product, as well as in a system comprising a computer processor and a memory coupled to the computer processor, wherein the memory is encoded with one or more computer programs for performing at least a part of the methods described herein.

It is made clear that presented embodiments may well be combined forming new embodiments not explicitly described herein.

In the claims, the term "comprises/comprising" does not exclude the presence of other elements or steps. Additionally, although individual features may be included in separate claims, these may be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

Although this disclosure has been described above with reference to (a) specific embodiment(s), it is not intended to be limited to the specific form set forth herein. Rather, this disclosure is limited only by the accompanying claims and, other embodiments than the specific above are equally possible within the scope of these appended claims.

The invention claimed is:

1. A method for queue management of Protocol Data Units, PDUs, in a node, the method comprising:
   receiving a flow of PDUs;
   associating each PDU with a flow reference that is determined based on information elements in at least each PDU header;
   grouping all PDUs having a same flow reference into respective sub flows;
   determining a priority indicator for each sub flow based on length of the sub flows;
   selecting one or more PDUs from the sub flows in an order of the sub flows which is indicated by the priority indicator; and
   sending the selected PDUs.

2. The method for queue management of PDUs according to claim 1, wherein the determining of the priority indicator for each sub flow is further based on length of the PDUs in each sub flow.

3. The method for queue management of PDUs according to claim 1, wherein the determining of the priority indicator for each sub flow based on the length of the sub flows comprises determining a highest priority for each sub flow having a single PDU.

4. The method for queue management of PDUs according to claim 1, wherein each PDU is part of a service session as indicated by each PDU header, and wherein the associating each PDU with a flow reference comprises associating each PDU of same service session with a same flow reference.

5. The method for queue management of PDUs according to claim 1, further comprising detecting a triggering condition comprising one of: receipt of MAC-layer information, receipt of information related to the control layer of Radio Link Control, RLC, and receipt of a PDU into a sub flow, wherein the detecting of the triggering condition triggers the determining of the priority indicator, the selecting one or more PDUs from sub flows, or the sending of the selected PDUs.

6. The method for queue management of PDUs according to claim 1, wherein the information elements comprises at least one of: a protocol or an application type, a source IP address, a destination IP address, a source port, and a destination port, which all are associated with a service session.

7. The method for queue management of PDUs according to claim 1, wherein the receiving a flow of PDUs comprises receiving a flow of PDUs within a single Radio Access Bearer, RAB.

8. The method for queue management of PDUs according to claim 1, wherein the receiving a flow of PDUs comprises receiving PDUs on a first protocol layer, wherein the sending the selected PDUs comprises sending the selected PDUs on a second protocol layer, and wherein the first protocol layer is a higher protocol layer than the second protocol layer.

9. The method for queue management of PDUs according to claim 8, wherein the first protocol layer comprises any of: Internet Protocol, IP, Transmission Control Protocol, TCP, User Datagram Protocol, UDP, Real-Time Control Protocol, RTCP, Datagram Congestion Control Protocol, DCCP, Stream Control Transmission Protocol, SCTP, Resource reservation Protocol, RSVP, Real-Time Transport Protocol, and Explicit Congestion Notification, ECN.

10. The method for queue management of PDUs according to claim 8, wherein the second protocol layer comprises RLC layer or Medium Access Control-d, MAC-d, layer.

11. A node for queue management of Protocol Data Units, PDUs, the node comprising:
- a first interface configured to receive a flow of PDUs and associate each PDU with a flow reference that is determined based on information elements in at least each PDU header;
- a classifier configured to group all PDUs having a same flow reference into respective sub flows;
- a selector configured to determine a priority indicator for each sub flow based on length of the sub flows, and select one or more PDUs from the sub flows in an order of the sub flows which is indicated by the priority indicator; and
- a second interface configured to send the selected PDUs.

12. The node for queue management of PDUs according to claim 11, wherein the selector is further configured to determine the priority indicator for each sub flow based on the PDUs grouped into each sub flow.

13. The node for queue management of PDUs according to claim 11, wherein the selector is further configured to determine a highest priority for each sub flow having a single PDU.

14. The node for queue management of PDUs according to claim 11, wherein each PDU is part of a service session as indicated by each PDU header, and wherein the first interface is configured to associate each PDU of the same service session with a same flow reference.

15. The node for queue management of PDUs according to claim 11, wherein the selector is further configured to detect a triggering condition comprising one of: receipt of MAC-layer information, receipt of information related to the control layer of Radio Link Control, RLC, and receipt of a PDU grouped into a sub flow, wherein the detection of the triggering condition triggers the selector to determine the priority indicator, or to select one or more PDUs from sub flows, or the second interface to send the selected PDUs.

16. The node for queue management of PDUs according to claim 11, wherein the first interface is configured to receive PDUs on a first protocol layer, and wherein the second interface is configured to send the selected PDUs on a second protocol layer, wherein the first protocol layer is a higher protocol layer than the second protocol layer.

17. The node for queue management of PDUs according to claim 16, wherein the first protocol layer comprises any of: Internet Protocol, IP, Transmission Control Protocol, TCP, User Datagram Protocol, UDP, Real-Time Control Protocol, RTCP, Datagram Congestion Control Protocol, DCCP, Stream Control Transmission Protocol, SCTP, Resource reservation Protocol, RSVP, Real-Time Transport Protocol, RTP, and Explicit Congestion Notification, ECN.

18. The node for queue management of PDUs according to claim 16, wherein the second protocol layer comprises RLC layer or Medium Access Control-d, MAC-d, layer.

19. The node for queue management of PDUs according to claim 11, wherein the node is at least one of a Radio Network Controller, RNC, a Base Station, a NodeB, and an eNodeB.

* * * * *